United States Patent [19]

Dochterman

[11] Patent Number: 4,482,124
[45] Date of Patent: * Nov. 13, 1984

[54] TORSIONAL VIBRATION ISOLATING MOTOR MOUNTING ARRANGEMENT AND METHOD OF MAKING THE SAME

[75] Inventor: Richard W. Dochterman, Fort Wayne, Ind.

[73] Assignee: General Electric Company, Fort Wayne, Ind.

[*] Notice: The portion of the term of this patent subsequent to Feb. 28, 1995 has been disclaimed.

[21] Appl. No.: 116,745

[22] Filed: Jan. 30, 1980

Related U.S. Application Data

[63] Continuation of Ser. No. 840,263, Oct. 7, 1977, abandoned, which is a continuation-in-part of Ser. No. 697,547, Jun. 18, 1978, Pat. No. 4,076,171.

[51] Int. Cl.$^3$ .......................................... F16M 13/00
[52] U.S. Cl. .................................... 248/604; 248/672
[58] Field of Search .............. 248/560, 603, 604, 605, 248/606, 618, 672

[56] References Cited

U.S. PATENT DOCUMENTS

| | | | |
|---|---|---|---|
| 1,329,816 | 2/1920 | Winslow | 248/558 |
| 1,761,752 | 6/1930 | Scott | 248/675 |
| 1,781,155 | 11/1930 | Anderson | 417/424 |
| 1,798,846 | 3/1931 | Kennedy | 248/605 |
| 1,976,897 | 10/1934 | Sievert et al. | 248/558 |
| 2,081,030 | 5/1937 | Anderson | 248/604 |
| 2,096,621 | 10/1937 | Skolfield | 248/604 |
| 2,214,942 | 9/1940 | Taub | 248/605 |
| 2,615,620 | 10/1952 | Goettl | 416/244 R |
| 2,832,554 | 4/1958 | Reisch | 248/603 |
| 3,035,761 | 5/1962 | Kinsworthy | 248/672 |
| 3,165,816 | 1/1965 | Thompson | 29/596 |
| 3,195,222 | 7/1965 | Rutledge | 29/596 |
| 3,502,290 | 3/1970 | Legrand et al. | 248/635 |
| 3,773,285 | 11/1973 | Morrill | 248/603 |
| 4,076,197 | 2/1978 | Dochterman | 248/604 |

FOREIGN PATENT DOCUMENTS

| | | | |
|---|---|---|---|
| 1125306 | 10/1956 | France | 248/604 |
| 230455 | 3/1969 | U.S.S.R. | 248/560 |

Primary Examiner—William H. Schultz
Attorney, Agent, or Firm—Ralph E. Krisher, Jr.

[57] ABSTRACT

Motor mounting system is designed so that the torsional mode resonant or natural frequency is less than twice the frequency of the motor power supply divided by the square root of two ($\sqrt{2}$). The illustrated mounting arrangements are "soft" with respect to torsional mode vibrations, and yet are "stiff" with respect to axial and tilting mode vibrations. In one arrangement, lugs are formed preferably from a tough and strong sheet or strip material that is thicker and substantially stronger and stiffer (even in the radial vibration mode) than would usually be desirable from a torsional vibration isolation standpoint, but means are provided for promoting flexure in the vicinity of the parts of the lugs that will be subject to the most flexure or deflection. These flexure promoting means may be in the form of tuning apertures formed along a preselected, longitudinally extending neutral axis of each lug so that the strength of the lug will not be objectionably compromised for axial loading conditionss. It is preferred to select the tuning means so that the cumulative effective spring constant (in pound-inches per radian) of the mounting lugs will be less than the quantity $(2.84 \times I_p \times 10^5)$, where $I_p$ is the polar moment of inertia measured in pound-inches-seconds$^2$. Also illustrated are mounting band members and torsionally flexible arms that interfit one with another in a slotted interrelationship. Ends of the arms are folded under a band member so that the ends of the arms are securely trapped by the band member against the outer peripheral surface of the motor. This technique assures that the motor will remain supported by the band member and arms, and minimizes the degree of weld or other fastener strength that would otherwise have to be provided between the arms and motor.

8 Claims, 21 Drawing Figures

TORSIONAL VIBRATION ISOLATING MOTOR MOUNTING ARRANGEMENT AND METHOD OF MAKING THE SAME

CROSS REFERENCE TO RELATED APPLICATIONS

This application is a continuation of application Ser. No. 840,263, filed Oct. 7, 1977, now abandoned, which is a continuation-in-part of my co-pending application Ser. No. 697,547, which was filed June 18, 1976 and titled "Torsional Vibration Isolating Motor Mounting Arrangement and Method of Making The Same" and which issued as U.S. Pat. No. 4,076,197 on Feb. 28, 1978. In addition, the subject matter of this application is generally related to the subject matter of Ernest W. Litch co-pending patent application Ser. No. 636,547, filed on Dec. 1, 1975, and assigned to the same assignee as the present application. The entire disclosure of the just-referenced co-pending Litch application and that of my own above-referenced application are incorporated herein by reference.

BACKGROUND OF THE INVENTION

The present invention relates generally to motor mounting arrangements and to methods of making the same that are particularly useful in connection with mounting a motor to a bulkhead, baffle, or other suitable motor supporting structure of a product in which such motor is used. Examples of such products are: room air conditioners, air circulation fans, blowers utilized for various air moving or air exhaust applications, and so forth.

In direct drive applications, i.e., applications where blowers or fans are mounted directly to a motor shaft, it is important to isolate motor vibrations from the bulkhead or other mounting surface. It is, of course, desirable to minimize the transmission of all modes of vibrations; but for the reasons pointed out in detail in the above-referenced Litch application, it is especially desirable to minimize the transmission of noise associated with torsional mode motor vibrations. In particular, the noise associated with torsional mode vibrations of twice line frequency and harmonics thereof tend to be very objectionable.

The approaches suggested by Litch constitute advances in the art, although there may be some difficulty in applying those approaches for some applications or under some circumstances. For example, there may be difficulty if the motor itself is manufactured by a process such that motor parts are secured together by structural adhesive materials; or if the motor is of relatively small mass and output, with the result that special manufacturing methods must be adhered to. More particularly, if a motor stator and bearing system is to be assembled and held together by structural adhesive material such as epoxy (as taught, for example, in Thompson et el U.S. Pat. No. 3,165,816, or Rutledge U.S. Pat. No. 3,195,222), it may not desirable from a manufacturing standpoint to have mounting arms or lugs attached to the shell of the motor during the assembly process. Moreover, for motors of relatively small mass and diameter (and thus relatively small polar moments of inertia of the motor mass), where suitable torsional mode vibration isolation is to be accomplished by suitably reducing the transmissibility of the mounting arms or lugs of torsional mode vibrations, difficulties may be encountered because the dimensions of the motor mounting arms or lugs may have to be reduced to such a size that manufacture thereof may be difficult, specially if the radial length of the arms is to be relatively small.

When martensitic steel is utilized to support a relatively small motor (for example, a motor weighing about 2.7 kilograms and approximately three and eight-tenths inches in diameter), and the mounting bolt-hole circle is approximately seven inches in diameter; martensitic steel mounting arms should be only about 0.0010 of an inch thick for good torsional vibration isolation. However, material this thin generally would be difficult to handle in high volume manufacturing operations and often would not possess sufficient strength to withstand at least some shock loading conditions.

It will therefore be understood that it would be desirable to provide new and improved mounting arrangements for motors wherein such mounting arrangements are characterized by improved torsional vibration isolation characteristics, and yet which may be easily manufactured and assembled with motors that are secured together with structural adhesive materials.

Still other problems are encountered for particular application where a torsionally flexible mounting arrangement is desired. For example, mounting a motor within a Sirroco blower housing presents a problem because the sidewall of such a blower is shaped in a logrithmic spiral to provide for the gradual expansion of the air flow expelling from one or more squirrel cage blower wheels attached to the motor shaft (or shafts). However, since the blower wheel (or wheels) is positioned relative to the housing to provide running clearances as desired, the motor often will not be positioned such that it is equadistantly located from two or more points along the periphery of the housing. This type of situation is particularly troublesome when blower wheels are placed at each side of a double shaft motor in order to achieve a full inlet at either side of the blower housing, and the motor is to be mounted internally to the sidewall of the housing rather than to an end wall as in a double inlet blower wheel application where air is taken in at both ends of a single wheel.

In some applications such as, for example, range or oven exhaust fan applications; severe shipping shock tests may not require a motor mounting arrangement that is as stiff in the axial and radial modes as a larger appliance such as a furnace. In fact, many small fan applications make use of elastomeric devices so that effective suppression of radial and axial mode vibrations will result. In some applications, however, a rubber mount may present a safely hazard.

For example, in range or oven applications, a rubber mount may serve as an accelerator in the advent of a grease fire. Moreover, the use of a rubber mount may interfere with establishing a reliable ground connection. It therefore will be understood that it would also be desirable to provide a new and improved motor mounting arrangement that was resilient in radial as well as axial and torsional modes and yet was neither a potential grease fire accelerator nor a potential ground connection failure.

Accordingly, it is a general object of the present invention to provide new and improved motor mounting arrangements and methods of making the same whereby the above-mentioned and other problems may be solved.

It is a more particular object of the present invention to provide a new and improved motor mounting arrangement and methods of making the same, that includes mounting arms which are made of material having sufficient thickness that the manufacture of such arms is facilitated and yet wherein the vibration transmissibility of such arms in objectionable frequency ranges is not objectionably increased because of the material thickness, and wherein the arrangement is mountable in a blower housing having a spiral surface.

It is a further object of the present invention to provide new and improved motors and lug assemblies, as well as methods and means of interconnecting the same, wherein two or more lugs or arms of different lengths are used to mount a motor relative to a blower housing and wherein the arms are tuned so as to have mutually equivalent flexibility and torsional resiliency.

Still another object is to provide a mounting arrangment wherein a satisfactory mounting system may be provided that has very few component parts.

Yet another object of the present invention is to provide a mounting arrangement that is effective for reducing vibrations in modes other than the torsional mode and that also avoids grease fire accelerator and ground connection problems.

SUMMARY OF THE INVENTION

In carrying out of the above and other objects of the invention in one preferred form thereof, I provide new and improved motor mounting arrangements wherein mounting arms may be specifically designed so that, in accordance with the preferred teachings of the above-referenced Litch application, the torsional mode resonant or natural frequency is less than twice the frequency of the motor power supply divided by the square root of two ($\sqrt{2}$).

The mounting arrangements illustrated herein are "soft" with respect to torsional mode vibrations, and yet are "stiff" with respect to axial and tilting mode vibrations. Moreover, the advantageous features of providing a structurally reliable mounting arrangement, and yet one which is easily deflectable torsionally for easy assembly with a mounting wall or baffle is also provided. Furthermore, arrangements are disclosed wherein unequal length arms are variably tuned so that uniform flexing about the motor axis results and yet the motor is readily mountable to a housing having a spiral wall.

In one specific form illustrated herein, an arrangement is provided that exemplifies the invention in the form of lugs which are flexible in the torsional direction, but strong and stiff in both the axial and radial directions. The lugs are formed preferably from a tough and strong material (such as martensitic steel). The selected material is thicker and substantially stronger and stiffer (even in the radial vibration mode) than would usually be desirable from a torsional vibration isolation standpoint. I then provide means for promoting flexure in the vicinity of the parts of the lugs that will be subject to the most flexure or deflection. These flexure promoting means may be in the form of apertures or holes that are formed along a preselected, longitudinally extending neutral axis of each lug so that the strength of the lug will not be objectionably compromised for axial loading conditions. The means for promoting flexure also constitutes, in preferred embodiments, means for "tuning" the vibrating system so that it will have low transmissibility characteristics for predetermined forcing frequencies. In the most preferred exemplifications, the tuning means will be selected so that the cumulative effective spring constant (in pound-inches per radian) of the mounting lugs will be less than the quantity $(2.84 \times Ip \times 10^5)$, where $Ip$ is the polar moment of inertia measured in pound-inches-seconds$^2$.

When the just described approach is followed, the mounting lugs or arms may be formed of materials sufficiently thick that they can withstand the abuses of normal factory manufacturing, handling, and shipping without becoming permanently deformed, and special metal stamping and forming techniques need not be followed.

In another form which may be used to particular advantage for Sirocco blower systems, a vibration isolation system is provided that accommodates a requirement for unequal length mounting arms while providing equivalent flexibility in the arms. Further, this arrangement can use only two arms to give the necessary stability and torsional resiliency; and this permits the use of a single piece mounting structure if desired. This system readily accommodates the placing of blower wheels on each side of a motor to achieve a full inlet at either end of the blower, and also lets the motor be mounted internally to the sidewall instead of to an end wall as in a double inlet blower wheel application.

In yet another specific illustrated embodiment of another form of the invention, I provide radially extending mounting lugs having a pleated or "V" configuration in the radially extending portions thereof, and circumferentially extending portions. Radial vibration such as that which might be caused by unbalance of a blower wheel and rotating components is isolated by flexing between a circumferentially extending and a radially extending portion of a lug, and a standoff or spacer may be used to encourage such flexing. The radial segment (i.e., the pleated or "V" configuration portion) encourages torsional mode pulsation isolation; and the "V" portion also allows a motor to twist and dissipate energy of vibration introduced by a wobbly fan.

The mounting band members and torsionally flexible arms may interfit one with another in a slotted arrangement. For example, ends of the arms may be folded under a band member so that the ends of the arms are securely trapped by the band member against the outer peripheral surface of the motor. This technique assures that the motor will remain supported by the band member and arms, and minimizes the degree of weld or other fastener strength that would otherwise have to be provided between the arms and motor. Alternatively, a one piece strap may readily be formed that fastens to a motor and which also has projecting ends that serve as mounting lugs. When these ends project different distances, they are tuned by using tuning apertures or by varying the dimensions of the ends.

The subject matter which I regard as my invention is set forth in the appended claims. The invention itself, however, together with further objects and advantages thereof may be better understood by referring to the following, more detailed description taken in conjunction with the drawings.

DESCRIPTION OF THE PREFERRED EMBODIMENTS

Figure 1:
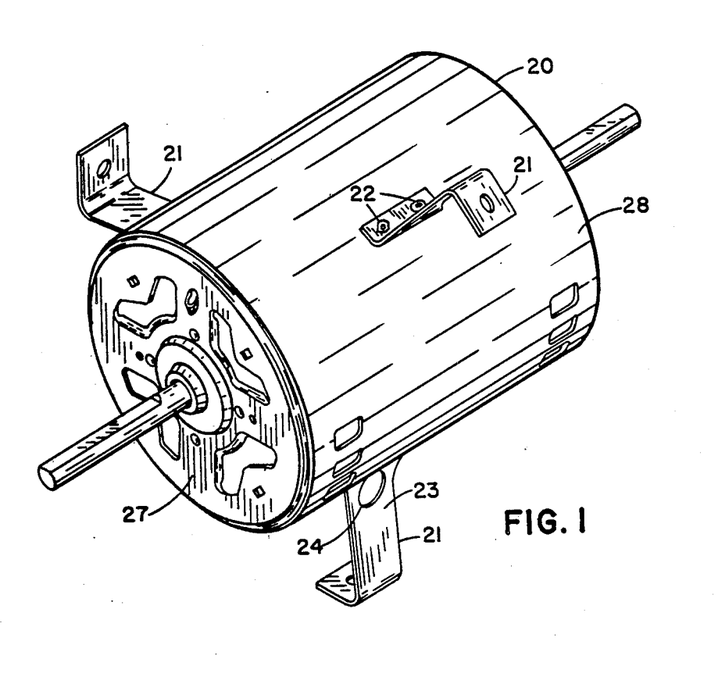
FIG. 1 is a perspective view of a motor having attached thereto mounting means in accordance with teachings presented herein and in my related application, and helpful in understanding the present invention.

In FIG. 1, I have illustrated a motor 20 having three flexible mounting arms 21 attached thereto by means of a number of spot welds 22. The mounting arms 21 are formed of a martensitic grade of steel and may be formed, for example, of a 140,000 or 160,000 psi "MartInsite" steel sold by the Inland Steel Company. However, it should be clearly understood that inventive features disclosed herein may be used when common steel or other engineering materials are used. Thus, not all embodiments of the various inventive features disclosed herein need to be made from martensitic steel.

The motor 20 in fact was only about 3.8 inches in diameter and 4¼ inches long (about 6¾ inches long overall from end of shaft to end of shaft). Moreover, the motor 20 has one-eighth horsepower, 4 pole shaded pole motor with an extended winding section to permit multi-speed operation. This motor weighed about 2.7 kg.

The mounting arm 22 had a radial length as observed in FIG. 1 so that they could be bolted to a baffle wall having an internal mounting diameter of about six inches. If arms similar to arms 21 were used with the radially extending portions 23 thereof solid pieces of material, they would be characterized by relatively high transmissibility. In order to reduce the transmissibility of the mounting arm 22, I preferably provide holes 24 of an arbitrary size in the radially extending portions thereof, perform noise transmissibility tests, and then progressively increase or decrease the size of the holes or apertures until the desired degree of vibration isolation is obtained. The size of openings 24 could also be calculated by making a structural analysis and calculating the strength and torsional spring constant of an arm 21 with an assumed opening size, by following known engineering calculation techniques.

It should now be apparent that when my teachings are followed, material may be selected for use in the manufacture of torsionally flexible mounting arms on the basis of easy manufacturability and machining of such material and the availability of standard thicknesses of such material. The resonant frequency of the arm for torsional mode vibrations can then be established at a desired value by modifying the spring characteristics of the lug by providing tuning holes or openings therealong. Thicker material usually would be selected for manufacturing reasons and also for mounting strength from a standpoint of buckling, tilting, and axial mode vibrations. The apertures 24 may be any desired shape, and reduce the area moment of inertia of the cross-sections of the arms 21 in the region of maximum flexure. Thus, an opening 24 should be located generally in the region of maximum flexure of a mounting arm 21. The region of maximum flexure may be readily determined by testing motor 28 while observing it under a strobe light that is energized at the same frequency as the particular vibration frequency of concern.

The tuning of arms 21 by providing apertures therein reduces the area moment of inertia of the cross-section of the lug as mentioned hereinabove, and reduction of this moment of inertia will increase the deflection of the mounting arm during operation of a given motor 20 under given conditions. Increased deflections in an arm 21 indicates a reduced stiffness of the arm and a lower natural frequency of the spring mass system involving the motor 20 and mounting arms 21. This, as will be understood from the above-referenced Litch application, desirably reduces the transmissibility of vibrations caused by operation of the motor 20.

For some applications, where the end frames 27 of a motor are to be secured to a housing or shell 28 of a motor by epoxy or other suitable engineering adhesive materials; it may be preferred to avoid subjecting the housing 28 to the localized heating effects that might take place when making spot welds 22. On the other hand, if the arms 21 are welded to the shell 28 prior to the process of securing the end frames 27 to the shell 28, the presence of the arms 21 may interfere during previously adopted processing steps that are followed when securing the end frames 27 to the stator housing 28. In such an event, a band-type mounting arrangement may be preferred to the arrangement shown in FIG. 1. Two alternate band-type mounting arrangements are shown in FIGS. 2 and 3, with the arrangement shown in FIG. 2 generally being preferred from a material utilization and ease of manufacture standpoint.

Figure 2:
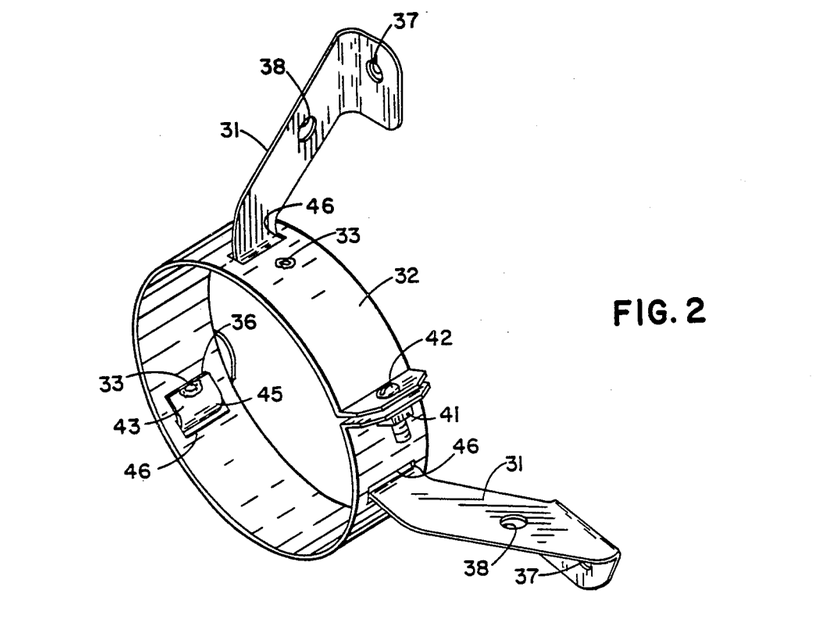
FIG. 2 is a view of a modified mounting system usable with the motor of FIG. 1.
Figure 3:
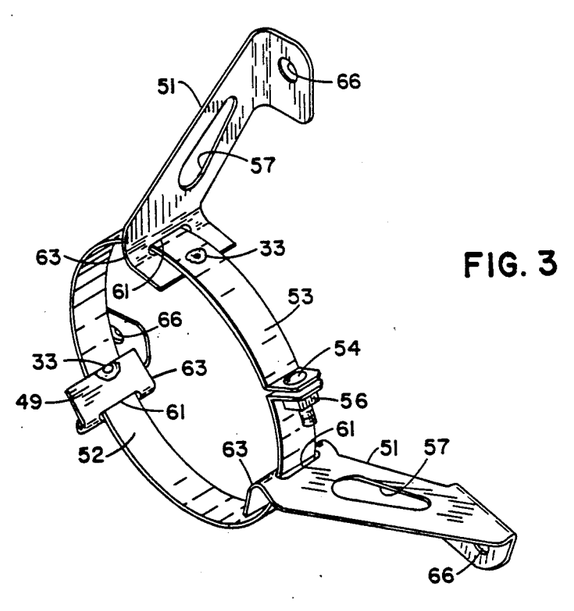
FIG. 3 is a view of another modified mounting system that may be used with the motor of FIG. 1.

Before commencing with a detailed description of the arrangements shown in FIGS. 2 and 3, it should also be noted that the technique of using welding straps as taught in the above-referenced Litch application may be followed rather than simply using spot welds as shown at 22 in FIG. 1. However, if the motor 20 is of small enough mass, and the application and shipping rigors to which the motor and arms 21 are to be subjected are not too great, the arms 21 may be welded directly to the motor housing 28 without objectionable results. It should be emphasized, however, that the suitability of directly welding arms 21 to the motor should be determined only by a thorough analysis of the particular application for the motor and mounting arrangement, and adequate testing of the selected arrangement.

In FIG. 2, three substantially identical mounting arms 31 are shown tacked by spot welds to ligature means in the form of a slotted band 32. The motor mounting ends of the arms 31 are welded as best revealed at weld spots 33. The amount and extent of each weld 33 is minimal in order to avoid undesirable degradation of the structural characteristics of the arms 31 when they are formed of martensitic steel. By locating the welds 33 adjacent the extreme end 36 of the arms 31, and by limiting the extend (and thus strength) of the weld so that it is just sufficient to hold the arms 31 in place on the band member 32 until the band has been slipped over the outer diameter of the motor 20; I take advantage of minimally expensive welding techniques without adversely affecting the martensitic grain structure characteristics of the arm 31. Of course, if the arms 31 were made of common steel there would be little (if any) concern about the annealing effect that would be caused by a welding operation.

Figure 4:
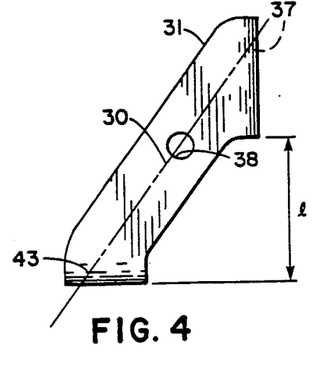
FIGS. 4, 5, and 6 are a side elevation, a front elevation, and a plan view, respectively, of a motor mounting arm used in the arrangement of FIG. 2.
Figure 5:
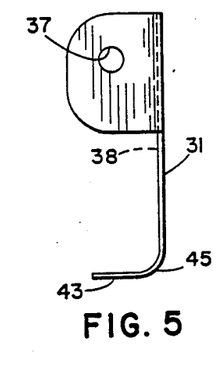
Figure 6:
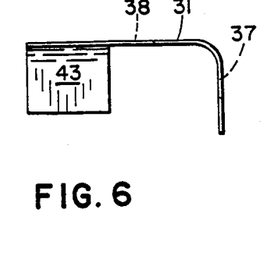

A typical arm 31 is shown in detail in FIGS. 4, 5, and 6; and reference is now made to those figures in conjunction with FIG. 2. It will be noted that the arms 31 are provided with fastener receiving apertures 37 which can accommodate fasteners would be used to mount a motor (trapped within the band 32) to a suitable mounting structure or baffle. Moreover, each arm 31 includes a tuning aperture 38 which is provided for the purpose of reducing the resonant frequency of the mounting arms 31. As will be understood, the arrangement shown in FIG. 2 may be slipped over the outer periphery of a motor such as the motor 20 (assuming that the arms 21 had not been supplied therewith, of course) and fastener means such as nut and screw 41, 42 will be tightened in order to tightly clamp the band 32 about the motor.

When the band 32 is tightened, the band itself will be placed in hoop tension and the feet or motor ends 43 of the arms 31 will be tightly clamped against the outer surface of the shell or housing 28 of the motor 20. Since the feet 43 will be tightly clamped against the motor, it should now be apparent that it would be redundant to provide a weld of sufficient extent and strength to permanently withstand separation of an arc 31 from the band 32. This desirable and economical arrangement is facilitated by slotting the band 32 as best shown at 46 and slipping the motor ends of the arms 31 therethrough, and then welding or tacking the motor ends 43 of the arms to the inner surface of the band member.

The same general technique that was just described is also followed in the arrangement of FIG. 3 where the motor ends 49 of the mounting arms 51 are tacked with a small weld to the inner surface 52 of band 53. Again, a screw and nut 54, 56, may be used to tightly clamp the band 53 about the outer periphery of a motor. It will be noted that the arms 51 also include tuning apertures 57 which were provided to reduce the natural frequency of the arms 51 with respect to torsional mode vibrations. The arrangement of FIG. 3 shows the band 52 extending through slots 61 formed adjacent the bend 63 of each arm 51. Moreover, each arm 51 is obviously provided with a mounting aperture 66 which may be used to mount the mounting arrangement of FIG. 3 (with the motor held thereby) to a suitable mounting structure or housing. It should also be apparent that the holes 66 (or holes 37) may be located at different effective radial distances in order to facilitate mounting to different mounting bolt circles.

It will be appreciated that with the arrangements shown in both FIG. 2 and FIG. 3, an interlocking slot and locking tab arrangement are provided between a band member and a mounting arm along a bent portion thereof. Moreover, it should be apparent that whether the arrangement of FIG. 2 or FIG. 3 is used will primarily be a matter of choice; although fabrication generally should be easier with the approach shown in FIG. 2. Moreover, whether the arrangement of FIG. 2 or FIG. 3 is utilized, it is necessary only to provide a small track or spot weld (or to use any other suitable, relatively low strength fastening means) for holding mounting arms in desired position relative to a band member. The actual assembly of the band member onto and about a motor housing then will firmly and tightly trap the mounting arms in a desired position against a motor housing or shell.

Whether the arrangements such as those shown in FIGS. 1, 2, or 3 are utilized, it is also desirable, in many applications, to utilize a material thicker than would otherwise be desired, and to tune the mounting arm made from such material so that it will have a lower resonant or natural frequency by providing one or more tuning apertures therein.

Specific examples of motor-motor mounting systems embodying my invention that have been constructed and tested are presented in Table I hereinbelow.

Each of the systems of Table I were constructed to mount on a seven inch mounting bolt circle, and the mounting arms (corresponding to arms 31 or 51 in FIGS. 2 and 3) were made, in each case, from 140,000 psi "MartInsite" steel having a thickness of 0.018 inches thick. Since preliminary calculations would indicate that such material should only be 0.010 of an inch thick, each arm had a tuning aperture therein so that the cumulative effective torsional spring constant $K_T$ for each exemplary system (in pound-inches per radian) had a value as listed in Table I. It will be understood that in cases where each mounting arm is substantially identical (as shown in FIGS. 2 and 3), and where the total number of mounting arms per system equals the number "n"; the torsional spring constant for each arm will be the cumulative effective torsional spring constant of the system divided by "n". By way of further explanation, each of the systems represented in Table I did in fact include three mounting arms.

TABLE I

| System | Motor O.D. (in) | $W_n$ (hz) | $I_p$ (lb-in-sec$^2$) | $K_T$ (lb-in/rad) | $2.84 \times I_p \times 10^5$ |
|---|---|---|---|---|---|
| A | 3.3 | 36.2 | 0.01223 | 632.7 | 3473 |
| B | 3.8 | 17.6 | 0.02054 | 251.2 | 5833 |
| C | 3.3 | 18.6 | 0.01229 | 167.8 | 3490 |
| D | 3.3 | 46. | 0.01364 | 1139. | 3874 |
| E | 3.3 | 39.2 | 0.01223 | 741.9 | 3473 |
| F | 3.8 | 15.3 | 0.0292 | 269.8 | 8292 |
| G | 3.8 | 16.8 | 0.01939 | 216. | 5507 |

The data presented in Table I indicates, for each system A through G; the approximate motor outer diameter in inches (O.D.); the natural or resonant frequency in hertz ($W_n$); the polar moment of inertia of the system in lb-in-sec² (Ip), assuming that the polar moment of inertia of the motor stator only constitutes the polar moment of inertia of the system (and thus ignoring any affect of the mounting arms and band); the calculated value of the torsional spring constant of each system in lb-in per radian ($K_T$); and the calculated value for $2.84 \times Ip \times 10^5$. Although Table I does not reveal the damping factor for each system A through G, it is now noted for disclosure purposes that the damping factor for each listed system was about 0.02.

A review of the data in Table I quickly reveals that the resonant frequency for each system was substantially less than twice line frequency (120 hz) divided by the square root of two. In addition, the total cumulative effective spring constant of the system was less, in every case, than the quantity $2.84 \times Ip \times 10^5$.

The data for Table I was generally determined by measurement or observation, coupled with mathematical calculations when necessary except for the quantities $K_T$ and $2.84 \times Ip \times 10^5$ which were simply calculated. As will be understood, $K_T$ for each system was calculated (after $W_n$ and Ip for each system had been determined) by using the well known relationship $$W_n = \frac{1}{2\pi} \sqrt{\frac{K_T}{Ip}}.$$

The resonant frequency was determined, in every case, by mounting the system to a support, attaching an accelerometer to the motor, and feeding low frequency power to the motor. The motor then is excited through a low frequency range, and the accelerometer output was observed to determine the lowest resonant frequency.

The polar moment of inertia of the stator can be determined by following the procedures published at page 200 of the May 23, 1968 issue of *Machine Design* magazine, or by: suspending a reference mass (also called a "calibrated inertia") having a known polar moment of inertia ($I_C$) from a wire and observing the time ($T_1$) for the reference mass to make "N" oscillations; suspending a motor stator with a bore plug adaptor having a known or determined polar moment of inertia ($I_A$); and measuring the time ($T_2$) for the stator and bore plug adaptor to make "N" oscillations.

The time ($T_C$) for one oscillation of the calibrated inertia would be determined form the relationship: $T_C = T_1/N$; and the torsional spring constant of the wire (K) will then be determined from the relationship: $K = I_C/T_C^2$.

The time ($T_R$) for one oscillation of the motor stator and adaptor plug is calculated from the relationship: $T_R = T_2/N$; and the inertis ($I_R$) of the motor stator and plug would be determined from the relationship: $I_R = KT_R^2$ or $I_R = (T_R/T_C)^2 I_C$. The value of the polar moment of inertia of the bore plug adaptor would then be subtracted from the calculated value of "$I_R$" in order to determine the value of the polar moment of inertia of the motor alone.

Figure 7:
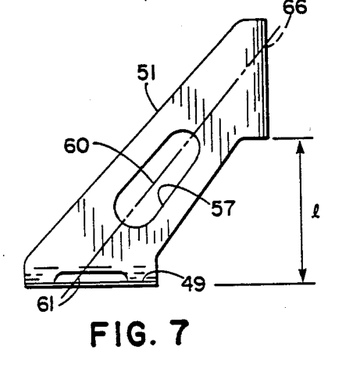
FIGS. 7, 8, and 9 are a side elevation, a front elevation, and a plan view, respectively, of a mounting arm that is used with the band member of FIG. 3.
Figure 8:
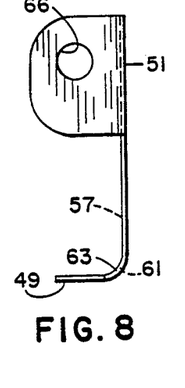
Figure 9:
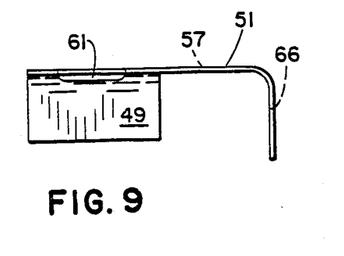

The importance of reducing the area moment of inertia of the lugs or arms 31 (or 51) by providing tuning apertures along the longitudinally extending neutral axes 30 or 60 will be better appreciated from the following relationships for the lug or arm when it is fastened at one end to the motor and at the bulkhead at the other end:

$$Y = \frac{1}{EI}\left(-\frac{ml^2}{2} + \frac{Fl^3}{3}\right) \quad (1)$$

$$M = \frac{T}{3} - FR \quad (2)$$

$$F = \frac{\frac{T}{3}\left(l + \frac{l^2}{2R}\right)}{lR + l^2 + \frac{l^3}{3R}} \quad (3)$$

where:
Y = deflection of arm or lug
E = young's modulus for arm
I = moment of inertia of the cross-sectional area of the lug
M = moment exerted by the motor
F = tangential force exerted by the motor
l = active length of lug (see FIGS. 4 and 7)
T = motor torque at operating speed
R = radius from the center of motor shaft to outer surface By substitution of the above relationship in order to eliminate the quantities "M" and "F" from equation (1), and by selecting "l" to be 1.23 inches and "R" to be 1.649 inches; equation (1) reduces to:

$$Y = \frac{1}{EI}(.0164T) \quad (4)$$

This equation clearly reveals that, for a given motor, increased deflections (and thus a lower torsional spring constant) will result when the moment of inertia of the cross-sectional area of the lug is reduced. Moreover, since the spring constant for a lug will be inversely proportional to the deflection, the above relationships may be used as a guide in selecting the size of the apertures 38 or 57 for a given arm or lug 31 or 51 that is to be used with a motor of radius "R" and torque "T".

Figure 10:
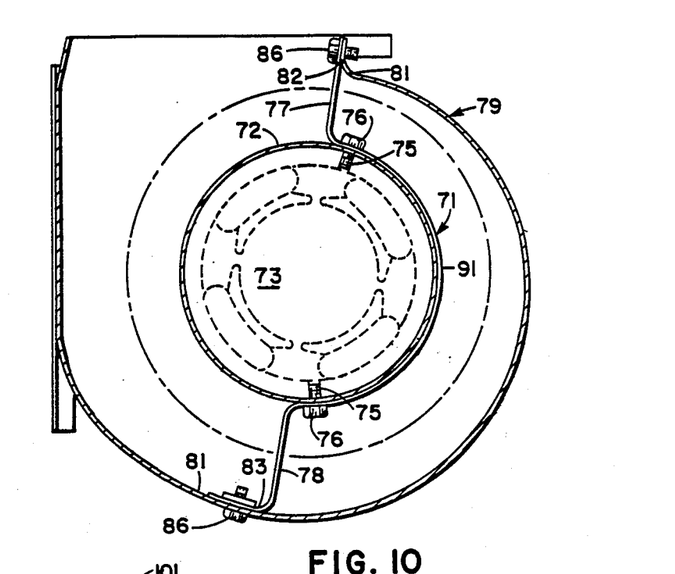
FIG. 10 is a side elevation, with parts removed and parts in section of a motor mounted in a Sirocco blower housing in accordance with one form of the present invention, and utilizing a motor mounting arrangement made in accordance with a particular aspect of my invention.
Figure 11:
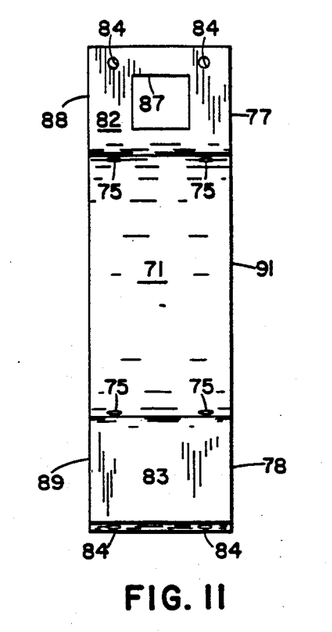
FIG. 11 is a front elevation of the motor mounting bracket shown in FIG. 10 and which embodies my invention in one specific form.

FIGS. 10 and 11 reveal a specific embodiment of my invention wherein a two lug, one piece mount 71 is fastened to the shell 72 of a motor 73 by means of screws 74, 76 that pass through holes 75 in the one-piece mount or bracket 71. In the embodiment of FIG. 10, a uniformly flexible mount is provided, and yet the mount has unequal length lugs 77, 78 because of the logrithmic spiral form of the Sirocco blower housing 79.

The one piece bracket 71 was formed to fit halfway around the motor 73 and extend the unequal arms or projecting ends thereof generally diagonally out to the scroll wall 81. The ends 82, 83 of the arms 77, 78 have mounting screw holes 84 formed therein by means of which mounting screws 86 may mount the bracket 71 (and thus motor 73) to the housing 79. The spring constant for the arm portions 77, 78 is made equal by adding a tuning hole in the otherwise stiffer arm as shown at 87.

Although a single hole 87 has been shown, it will be understood that the tuning means could be in the form of multiple apertures, cut outs along the edges 88, 89 of the arm 77, or in the form of reduced material thickness, although this latter approach would probably most easily be put into practice by making the arms 77, 78 separate and unconnected pieces. In this regard, it will be apparent that two separate arms could be used instead of a single, one-piece bracket. The choice of which system to use normally should be made on the basis of producibility and cost; however, another approach to tuning the arm 77 would be to reduce the width of the arm 77, rather than simply notching it along the edges 88, 89.

Figure 21:
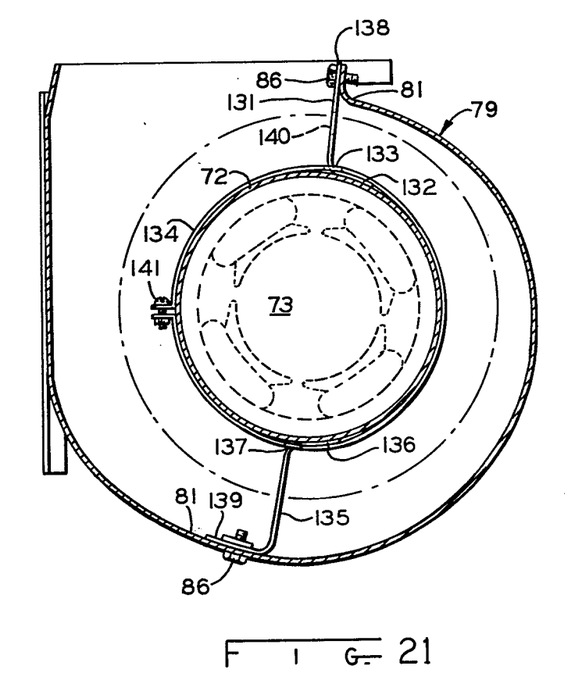
FIG. 21 is a side elevation similar to FIG. 10, showing yet another specific embodiment of my invention.

FIG. 21 reveals another specific embodiment of my invention wherein a two lug, band type mount is fastened to the shell 72 of a motor 73 by means of screw 141. In the embodiment of FIG. 21, the mount has unequal length legs or lugs 131, 132 because of the previously mentioned logrithmic spiral form of the Sirocco blower housing 79. Ends 132, 136 of these legs are trapped and held between the band 134 and motor shell or housing 72.

The band 134 was formed to fit around the motor 73 and the unequal arms 131, 135 project generally diagonally out to the scroll wall 81. The ends 138, 139 of the arms 131, 135 have mounting screw holes formed therein by means of which mounting screw 86 may mount the band or bracket 131 (and thus motor 73) to the housing 79. The spring constants for the arm portions 131, 135 are made equal by adding a tuning hole 140 in the otherwise stiffer arm 131.

Although a single hole 140 has been shown, it will be understood that the tuning means could be in the form of multiple apertures, cut outs along the edges of the arm 131, or in the form of reduced material thickness for arm 131 as compared to arm 135. Still another approach to tuning the are 131 would be to reduce the width of the arm 131 (as compared to arm 135) rather than simply notching the arm 131 along its edges or placing a tuning hole in it.

It will now be understood that FIG. 21 clearly illustrates an embodiment wherein band means and at least one are interfit, one with another, in a slotted arrangement wherein the ends 132, 136, of the arms 131, 135 respectively are fitted through the slots 133,137 of the band 134. Thus, the band 134 tightly traps the ends 132, 136 against the shell 72 of the motor 73. In this regard, the slotted interfitting relationship of the structure shown in FIG. 21 is the same as that shown in both FIGS. 12 and 13.

It should now be understood that I have provided a new and improved system wherein two flexible arm portions having different radial length dimensions may be connected by a partial belly band section 91, may be separate arms trapped byt band means against the motor in which case at least one arm and such band means may interfit with a slotted arrangement (e.g., see FIGS. 2 and 3), and wherein, in order to have uniform flexing about the axis of the motor, the spring constants of the arms are adjusted. In the illustrated form, the adjustment was accomplished by introducing a tuning hole in the shorter, stiffer arm thus reducing the moment of inertia of the cross-sectional area until the spring constants became equal.

Figure 12:
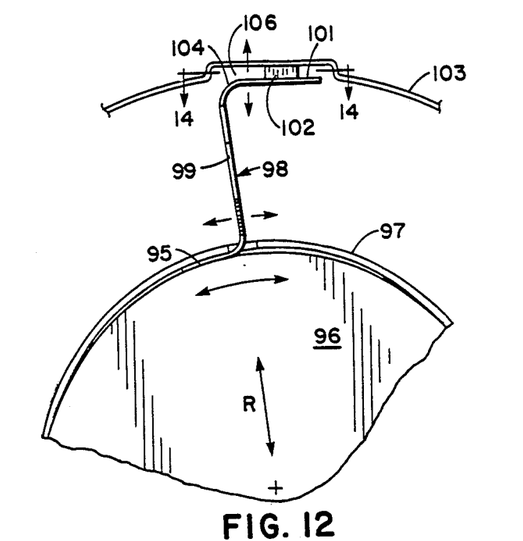
FIG. 12 is a front elevation of a system including a motor mounting arrangement, with parts removed and parts in section, embodiment another form of my invention.
Figure 13:
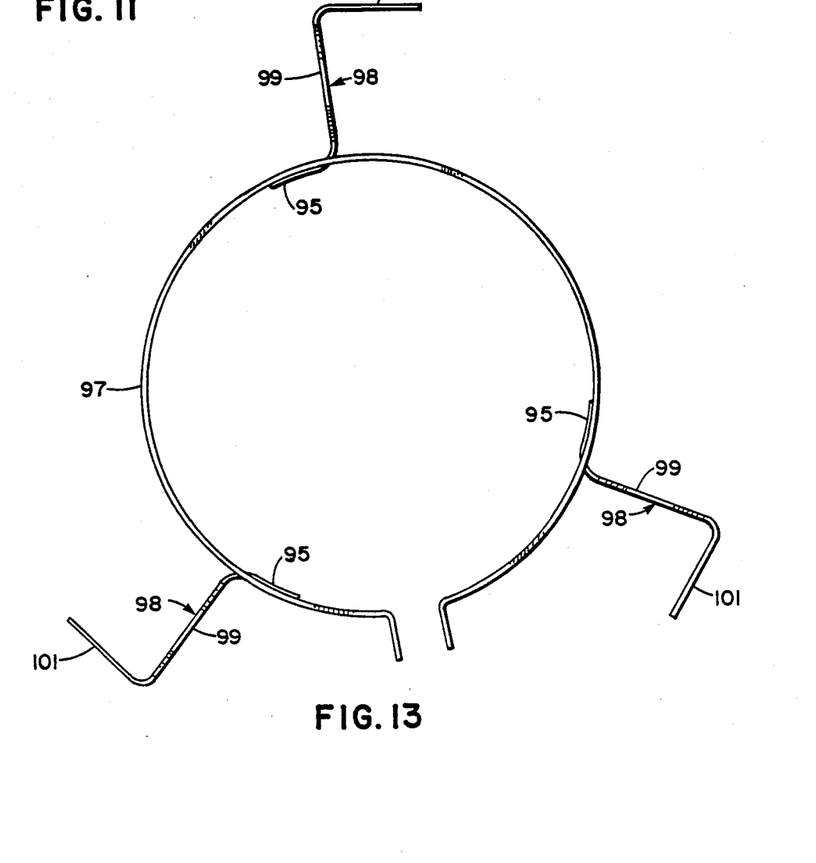
FIG. 13 is an elarged front elevation of part of the arrangement shown in FIG. 12.

With reference now to FIGS. 12 and 13, it will be appreciated that I have shown a vibration isolation mounting system which not only isolates specific modes of vibration, but also does away with the need for a separate grounding lead and at the same time does not require the use of an elastomeric vibration isolator which could serve as an accelerator in the advent of a grease fire.

In FIG. 12, a motor 96 (with parts broken away) has been illustrated wherein it is supported by means of a band or strap 97 which is essentially the same as the band or strap shown in FIG. 3. As will be understood, the band 97 will be clamped onto the motor 96 by suitable clamping means and in this regard an arrangement such as the nut and bolt 41, 42 shown in FIG. 2 may be used if desired. A lug 98 has a motor end 95 thereof fastened to the band 97 by any suitable means although, depending upon the materials selected for use in making the lug 98, it may be desirable to weld the band and lug together at a spot in the same manner as was done in connection with the structure shown in FIG. 2. A radial portion 99 of the lug 98 extends radially from the motor and terminates at a right angle mounting portion 101. A stand-off spacer 102 is then interposed between the mounting portion 101 and a mounting ring 103 to provide room for flexing movement of the lug 98 in response to radial mode vibrations. Thus, during vibrations of the motor in a radial direction as indicated, for example, by the arrow "R", the bent portion 104 of the lug 98 will have room to deflect into the space 106. Similarly, the other lugs 98 that are used to support the motor 96 will also be free to vibrate radially as will be understood.

Typically, radial vibration that might be caused by unbalance of a blower wheel attached to the shaft of the motor 96 and other rotating components will be isolated by the right angle mounting portions 101. The radial segment 99 of the lug 98 will isolate torque pulsations such as those that might be generated by the AC motor 96 in the same manner as has been previously discussed hereinabove.

In addition, the radial portion 99 of the lug 98 has a special configuration which will allow the motor 96 to twist and the radial segment or portion 99 will dissipate the energy vibration introduced by a wobbly fan. The configuration that I have chosen for the radial segment 99 also provides a way to have a relatively long spring arm with a low spring constant in torsion that will fit a relatively confined radial space between the motor and mounting ring.

FIG. 13 reveals the relationship between three lugs 98 and the band 97; while FIGS. 14 and 15-19 reveal specific constructional details and the specific configuration of the radial portion 99 of the lug 98.

Figure 14:
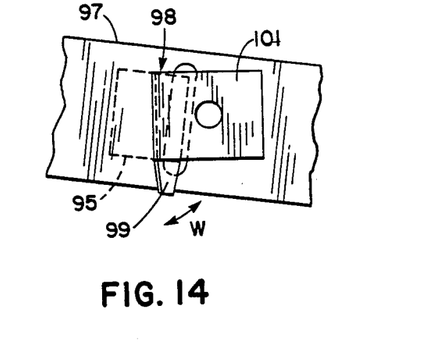
FIG. 14 is a view taken in the direction of lines 14—14 in FIG. 13.

In FIG. 14, an arrow "W" has been applied to indicate the type of flexing or twisting motion that may be imparted to the motor 96 due to a wobbly fan. Moreover, the lug 98 has been shown in FIG. 14 in a somewhat distorted form in order to emphasize the type of distortion or flexing that will take place in the lug 98 as a result of an unbalanced and wobbly movement of the motor induced by a wobbly fan.

Figure 15:
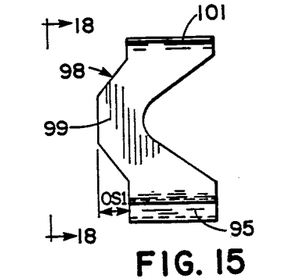
FIGS. 15, 16, and 17 are side elevations of three different lugs that may be used in the arrangement of FIG. 13.

FIG. 15 is a side elevation of one of the lugs 98 and this figure quickly reveals the "V" configuration of the radial portion 99 of lug 98.

Figure 18:
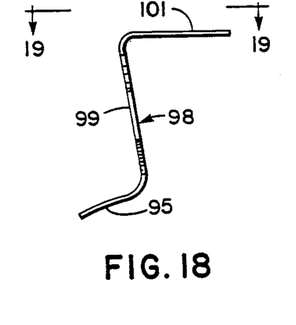
FIG. 18 is a rear elevation of the lugs shown in FIGS. 15, 16, and 17.
Figure 19:
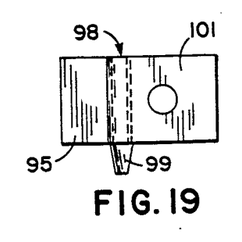
FIG. 19 is a view in the direction of lines 19—19 in FIG. 18.

FIG. 18, on the other hand, is an end elevation taken by looking in the direction of lines 18—18 on FIG. 15 while FIG. 19 is a plan view of the lug 98 taken in the direction of lines 19—19 on FIG. 18. The lug 98 was made from 0.018 inch thick steel and was dimensioned such that FIG. 15 is essentially a full-scale representation thereof.

For purposes of reference, when modified lugs are considered hereinbelow in conjunction with FIGS. 16 and 17, it is noted that the offset dimension OS-1 for lug 98 was nominally about 0.234 inches. Moreover, the radius at the notch of the "V" was about 7/16 of an inch.

Figure 16:
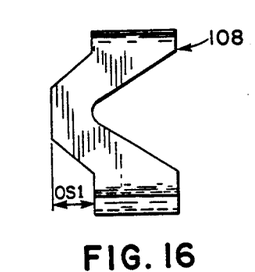

FIG. 16 reveals a modified lug 108 embodying the invention and the lug 108 was made from 0.025 inch thick steel and differed from the lug 99 essentially in that the offset dimension OS1 was about 0.359 inches and the radius at the apex of the "V" was about ⅛ of an inch.

Figure 17:
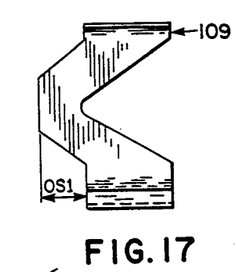

Two other modified lugs were also manufactured and tested and those lugs had the configuration as shown by the lug 109 in FIG. 17. The other two lugs differed from each other in that a first one was made from 0.018 inch thick steel whereas a second one was made from 0.025 inch steel. Both of the lugs which corresponded to the lug 109 had an offset dimension OSI of nominally 0.419 inches and the radius at the apex of the "V" was nominally about 1/16 of an inch.

Figure 20:
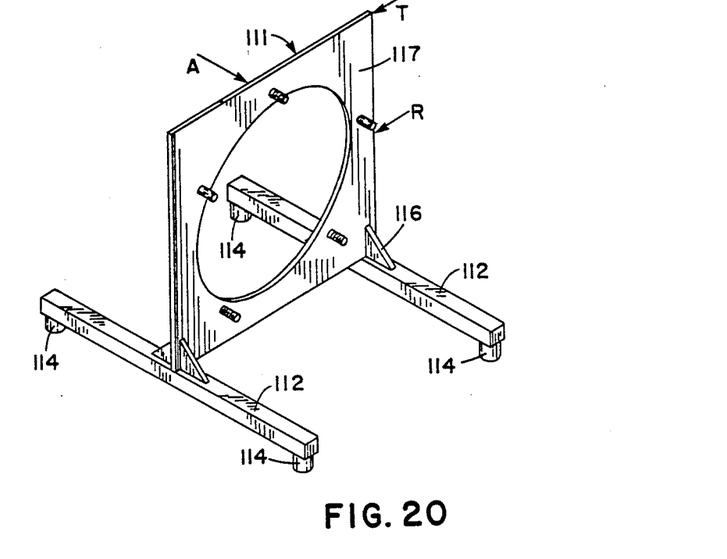
FIG. 20 is a perspective view of a test stand that was used to measure the performance of systems such as that shown in FIG. 12.

The lugs represented by FIGS. 15-17 were assembled with a band and fastened to a motor, then mounted to a mounting ring (as indicated for example by the mounting ring 103 in FIG. 12) and the mounting ring was fastened to a test fixture illustrated as fixture 111 in FIG. 20. The legs 112 of the fixture 111 were made from ¾ inch square cold rolled steel and those legs in turn were 10 inches long and supported at the ends thereof by rubber grommets 114. Welded by means of small gussets 116 to the center of the legs 112 was a mounting plate 117, the mounting plate being formed from ¼ inch cold rolled plate steel. The mounting plate 117 had an overall dimension of 10 inches by 10 inches square and had a cut-out in the center thereof of 7½ inches diameter. A motor and blower wheel was then supported, during a series of tests, by mounting arrangements that made use of the four different mounting lugs that have been described hereinabove in connection with FIGS. 15-17. The motor was energized with 60 cycle, 110 volt power and measurements were taken by placing an IRD displacement pickup at the points indicated by the arrows "A", "T", and "R" in order to detect axial, tangential, and radial vibrations respectively. The instrumentation used to determine the amount of vibration in the direction of the arrows "A", "T", and "R" included an IRD displacement pickup and vibration meter.

Data that was obtained showed that there was a substantial lowering of vibration (via displacement) in all six modes and particularly in the axial mode by comparison to a conventionally used mounting system which makes use of elastomeric rubber mounts. The other modes were torsional, radial, lateral, vertical tilting and horizontal tilting. Thus, it should be appreciated that I have now provided a means by which elastomeric vibration isolators may be dispensed with and yet wherein the vibration isolation characteristics of a motor mounting system are substantially improved.

Table II hereinbelow presents the test data that I obtained utilizing the instrumentation described hereinabove in connection with the test fixture of FIG. 20 for five different mounting systems. The first mounting system utilized elastomeric vibration absorbers of a type utilized heretofore in the prior art, a mounting arrangement utilizing lugs as described hereinabove as lug 98, lugs as illustrated by lug 108, and two different sets of lugs corresponding to lug 109, one of which was made from 0.018 inch thick steel and the other of which was made from 0.025 inch thick steel.

During the test for which the data of Table II was obtained, the IRD displacement pickup was engaged at three different positions along the plate of the test fixture in order to obtain three different readings that are reproduced in Table II.

TABLE II

| MTG | VOLTS | RPM | AXIAL | RADIAL | TANGENTIAL |
|---|---|---|---|---|---|
| Prior Art | 115 | 1685 | 1.87 | 1.81 | 1.95 |
| lug 98 | 115 | 1655 | 11.0 | 2.2 | .68 |
| lug 108 | 115 | 1660 | 1.95 | .23 | .345 |
| lug 109 (.018 in.) | 115 | 1660 | 1.15 | .31 | .58 |
| lug 109 (.025 in.) | 115 | 1650 | .32 | .48 | .48 |

It will be appreciated that the axial vibrations transmitted while utilizing the lug 98 generally were poorer than when using the lugs 108 and 109, and it is believed that this is due to the different radii used at the apex of the "V" or notch in each of the lugs (as compared more thoroughly hereinabove) and also due to the different dimensions of the offset dimension OS1. It thus is believed that it is preferable for the apex "V" to have a radius of less than 7/16 of an inch and the overall radial dimension of the lug is about 2.56 inches as illustrated and, further, it is believed that any dimension equivalent to the offset dimension OS1 should be greater than about 0.234 inches.

While I have now shown and described preferred and alternate embodiments of arrangements embodying the invention and methods of making and using the same; the disclosure contained herein should be construed as being exemplary in nature, and the invention itself, therefore, should be limited only by the scope of the claims that are appended hereto and that form part of my disclosure. 9n

What I claim as new and desire to secure by Letters Patent of the United States is:

1. In a torsional mode vibration isolating mounting arrangement for an alternating current induction motor designed for excitation by an alternating voltage of a predetermined source frequency, and wherein said motor has a polar moment of inertia Ip, measured in pound-inches-seconds$^2$, said mounting arrangement including a plurality of arms, formed from sheet material, extending radially from the motor and at least one of which arms has at least one tuning aperture formed therein; said at least one tuning aperture being relatively sized and located so that the cumulative effective spring constant of the mounting arrangement, in pound-inches per radian, will be less than the quantity $2.84 \times Ip \times 10^5$; the improvement wherein: the arrangement includes at least two arms of different effective radial lengths, and wherein said at least two arms have generally equivalent torsional mode flexibility characteristics.

2. The invention of claim 1 wherein the at least two arms are interconnected together by a partial belly band section, and wherein the at least two arms and belly band section are formed from a unitary strip of material.

3. The invention of claim 1 wherein the at least one tuning aperture lies generally along a radially extending plane that contains a longitudinally extending neutral axis, and the at least one tuning aperture is generally symmetrical about the neutral axis, whereby the at least one aperture does not substantially reduce the strength of the at least one arm in the axial direction.

4. The invention of claim 1 wherein the at least one of which arms has a tuning aperture located therein along the region of the arm subject to maximum deflection caused by torsional mode motor vibrations.

5. The invention of claim 1 wherein at least one of the arms has a motor end thereof tightly trapped against the motor by band means.

6. The invention of claim 5 wherein the band means and the at least one arm interfit, one with another, in a slotted arrangement.

7. The invention of claim 1 wherein the arrangement includes only two arms.

8. The invention of claim 7 wherein the two arms are interconnected together by a partial belly band section, and wherein the at least two arms and belly band section are formed from a unitary strip of material.

* * * * *